United States Patent [19]

Roderick

[11] 4,004,669
[45] Jan. 25, 1977

[54] CLUTCH ASSEMBLY WITH FLOATER PLATE AND SHOCK CANISTERS

[75] Inventor: Zachary A. Roderick, Bethel Island, Calif.

[73] Assignee: Galgon Industries, Inc., Fremont, Calif.

[22] Filed: Sept. 2, 1975

[21] Appl. No.: 609,234

[52] U.S. Cl. .......................... 192/70.17; 192/18 R; 192/55; 192/113 A; 64/27 NM
[51] Int. Cl.² ................. F16D 13/46; F16D 13/68; F16D 3/70
[58] Field of Search ............. 192/18 R, 55, 70.17, 192/106.1, 113 A; 64/27 NM

[56] References Cited

UNITED STATES PATENTS

| 2,090,787 | 8/1937 | Eberhard | 192/55 X |
|---|---|---|---|
| 2,143,300 | 1/1939 | Cole | 192/70.17 |
| 2,167,705 | 8/1939 | Batten | 192/55 |
| 2,301,600 | 11/1942 | Wilson | 192/70.17 X |
| 2,899,038 | 8/1959 | Wellauer | 192/55 X |
| 3,768,276 | 10/1973 | Caldwell et al. | 64/27 NM X |

Primary Examiner—Allan D. Herrmann
Attorney, Agent, or Firm—Flehr, Hohbach, Test, Albritton & Herbert

[57] ABSTRACT

A clutch assembly is disclosed in which an annular floater plate is mounted between a pair of pressure plates adapted to be engaged and disengaged with the floater plate to connect an engine-driven flywheel with a drive shaft. A plurality of shock canister units are mounted about the circumference of the floater plate and each canister unit includes an annular shock pad of a resilient material contained within a rigid cylindrical shell which in turn is mounted for axial sliding movement within arcuate sockets formed in the floater plate rim. The spindle of a drive bolt is mounted within each of the shock pads and the bolts in turn are threadably mounted on the flywheel so that upon engagement of the clutch assembly shock forces are absorbed by the canister units. The inner radius of the floater plate is isolated from the drive shaft for minimizing wobble which could otherwise occur due to misalignment of the elements, and thereby minimize friction and heat build-up. The floater plate is configured to be free of stress risers such as lubrication or mounting holes and sharp corners, and the outer rim of the plate is formed with a smooth curved contour so that cooling air is pumped by centrifugal action across the surfaces of the pressure and floater plates.

4 Claims, 4 Drawing Figures

U.S. Patent Jan. 25, 1977 Sheet 1 of 2 4,004,669
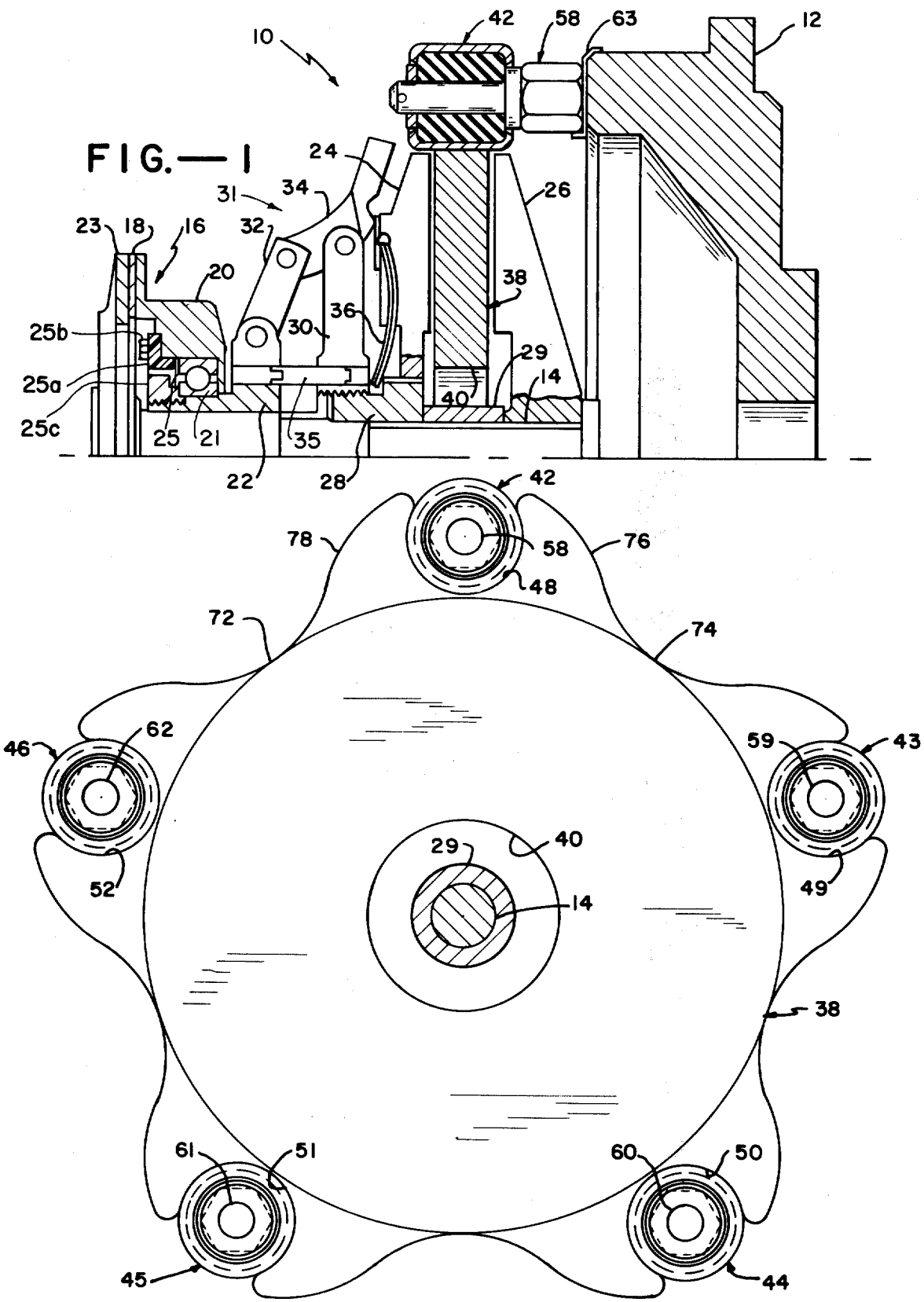
FIG.—1
FIG.—3

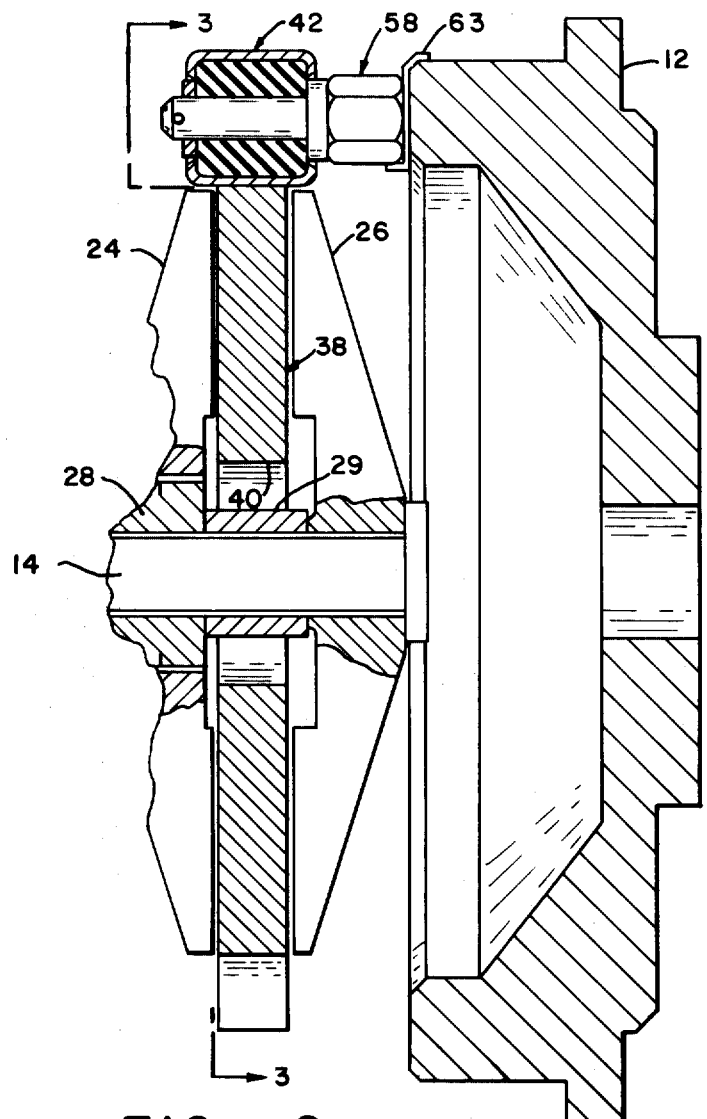
FIG.—2
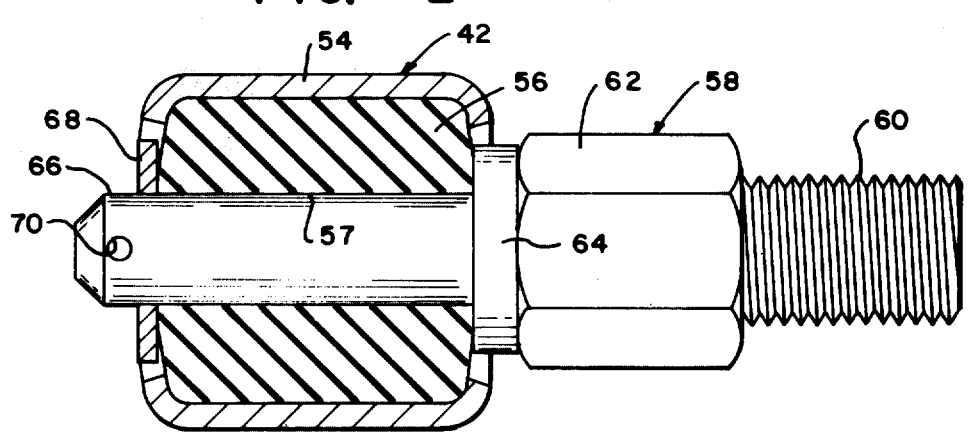
FIG.—4

CLUTCH ASSEMBLY WITH FLOATER PLATE AND SHOCK CANISTERS

BACKGROUND OF THE INVENTION

This invention relates in general to flywheel clutch assemblies of the dry type i.e., clutch assemblies having pressure plates which are actuated to engage with and disengage from a drive plate connected with the flywheel of an engine.

Flywheel clutch assemblies of the type described are used to transmit torque from an engine to a drive shaft on a vehicle, such as a crawler tractor. In conventional clutch assemblies of this type the outer rim of the clutch drive plate is connected with the flywheel through a plurality of flexible links. One end of each flexible link is mounted on a drive pin projecting from the flywheel and the other end is bolted to the clutch plate by a shackle. The inner diameter of the drive plate is rotatably mounted about the drive shaft by means of a roller bearing assembly. A radial hole drilled through the drive plate and terminating with a zerk fitting is provided for lubricating the bearing. Axially extending holes are also drilled around the inner margin of the drive plate for connecting bearing shields and oil thrower plates.

Existing clutch assemblies of the type described have a number of limitations and drawbacks which can lead to serious mechanical problems in the drive train, premature failure of the clutch assembly, and attendant downtime and expense for maintenance, repair or even replacement of the clutch assembly. Among the problems which are encountered with these clutch assemblies is that of wobble in the drive plate which can arise from mounting of the drive plate on a center bearing about the drive shaft, which can be misaligned with the clutch elements. This wobble produces friction against the pressure plates during clutch engagement, thereby generating excessive heat which radiates out through the drive plate. Temperatures as high as 600° F can be generated in many cases. This heat build-up destroys the lubricating properties of the grease in the bearing which can thereby fail, and the heat can cause fatigue cracks in the metal and ultimately failure of the clutch. The problem is compounded by the presence of stress risers in the drive plate, such as along sharp corners in the plate or along the radial grease hole or bearing end plate mounting holes. Excessive wobble in the bearing and clutch plate is also transmitted through the drive shaft to the transmission, which can be severely damaged in extreme cases. Moreover, because of the undesirable wobble action excessive forces are required for operating the handle to engage the clutch. A further problem is the requirement to periodically lubricate the center bearing. The zerk fitting on the clutch plate is in a relatively inaccessible position where it is difficult to lubricate so that mechanics tend to neglect this lubrication point. Such improper lubrication can lead to total failure of the bearing assembly which in turn requires expensive downtime for replacement.

OBJECTS AND SUMMARY OF THE INVENTION

It is a general object of the invention to provide a new and improved clutch assembly which is relatively simple and inexpensive in design and construction and which will obviate the problems encountered in existing clutch assemblies.

Another object is to provide a clutch assembly of the type described incorporating a floater plate which drivingly interconnects a flywheel with pressure plates of the clutch. The inner radius of the floater plate is isolated from the drive shaft to eliminate undesirable wobble of the plate and thereby minimize friction between the floater and pressure plates so that heat build-up is minimal.

Another object is to provide a clutch assembly of the type described having a floater plate which does not require a bearing or other support about the drive shaft so that problems of bearing lubrication and burn out are obviated.

Another object is to provide a clutch assembly of the type described in which bearing lubrication and mounting holes are not required thus eliminating the weakening and stress riser effect of these holes.

Another object is to provide a clutch assembly of the type described which has a relatively longer life for the clutch assembly and also for the transmission which is connected with the clutch assembly.

Another object is to provide a clutch assembly of the type described which is relatively easier and faster to install and replace within a vehicle, and which furthermore can be retrofit onto an existing vehicle having a conventional clutch assembly.

Another object is to provide a clutch of the the type described which eliminates clutch plate wobble and thereby reduces the amount of force which would otherwise be required to operate the clutch handle for such a clutch.

The invention in summary comprises a clutch assembly adapted to transmit torque from an engine-driven flywheel to a drive shaft by means of spaced-apart axially moveable pressure plates. An annular floater plate is mounted between the pressure plates and about the drive shaft with a radial clearance being provided between the floater plate and drive shaft with no bearing between these elements. The floater plate is connected with the flywheel by means of a plurality of shock canister units which are mounted in arcuate sockets formed about the rim of the plate. Each shock canister unit includes an annular shock pad formed of an elastomeric material, with the pad being confined within the rigid shell which in turn is mounted for axial sliding movement within a socket of the plate. The spindle of a drive bolt is mounted through the bore of the shock pad and the opposite end of the bolt is secured to the flywheel. The rim of the floater plate is formed with a smooth contour having concave portions between the canister units so that air is pumped by centrifugal action to establish a flow of cooling air across the surfaces of the floater and pressure plates.

The foregoing and additional objects and features of the invention will appear from the following description in which the preferred embodiments have been set forth in detail in conjunction with the accompanying drawings.

BRIEF DESCRIPTION OF THE DRAWINGS

FIG. 1 is an axial section view of a clutch assembly according to the invention.

FIG. 2 is an axial section view to an enlarged scale of component elements of the clutch assembly of FIG. 1.

FIG. 3 is a cross-sectional view taken along the line 2—2 of FIG. 3.

FIG. 4 is an axial sectional view to an enlarged scale of a shock canister unit and drive bolt of the clutch assembly.

DESCRIPTION OF THE PREFERRED EMBODIMENTS

In the drawings FIG. 1 illustrates generally at 10 a clutch assembly of the invention for drivingly connecting an engine-driven flywheel 12 with a transmission, not shown. The flywheel clutch assembly 10 is of the dry type and is adapted for use in drive trains of vehicles such as crawler tractors, for example.

Clutch assembly 10 incorporates a clutch shaft 14 which is mounted for rotation about an axis concentric with the flywheel. A conventional friction plate type brake assembly 16 is mounted between the clutch shaft and transmission for automatically bringing the rotating clutch shaft to a stop upon disengagement of the clutch. The brake assembly 16 includes a pressure plate 18 attached to a clutch release collar 20 which is rotatably fixed with a release yoke (not shown) of the clutch assembly. The release collar in turn is mounted for relative rotation by a bearing 21 about a mounting collar 22 splined for axial sliding movement on the clutch shaft to bring the pressure plate into and out of engagement with a brake disc 23 mounted for rotation with the clutch shaft. The outer race of bearing 21 is retained by a thrust washer 25 which is captured by an annular plate 25a secured to collar 20 by means of a circle of bolts 25b. The inner race of the bearing 21 is retained by a nut 25c which is threaded on the end of collar 22.

A pair of axially spaced pressure plates 24, 26 are mounted for rotation with the clutch shaft. The end pressure plate 26 is fixedly attached to the end of the clutch shaft while the pressure plate 24 is splined for axial sliding movement about an adjusting hub 28. The bore of the adjusting hub is in turn splined for axial sliding movement along the clutch shaft. The adjusting hub is held in axially spaced position from pressure plate 26 by means of a spacer sleeve 29 which is mounted about the drive shaft.

An adjusting collar 30 is formed with a central opening which is threadably mounted about an end of adjusting hub 28. Rotation of the collar 30 relative to the adjusting hub adjusts the pressure plate spacing. A plurality of clutch toggle levers 31 are provided and comprise interconnected spring links 32 and cams 34 are mounted at circumferentially spaced positions by rigid links 35 between mounting collar 22 and adjusting collar 30. A plurality of leaf springs 36 are mounted at circumferentially spaced positions about the inner diameter of pressure plate 24 with the inner ends of the springs yieldably pressing against the rim of adjusting hub 28 so that the spring reaction force normally urges this pressure plate in a direction away from the opposite pressure plate 26 for clutch disengagement. A conventional clutch operating lever mechanism, not shown, is provided to engage the clutch by moving the release collar 20 to the right as viewed in FIG. 1 with the spring links 32 snapping through an over-center position for automatically keeping the clutch engaged. The clutch is disengaged by moving the release collar to the left.

An annular floater plate 38 is mounted between the pressure plates for transmitting torque from the flywheel to the drive shaft when the clutch is engaged. The floater plate is fabricated from a suitable high strength material, such as cast iron, and its opposite ends are machined flat for engaging the flat pressure plates. A circular bore 40 is formed in the floater plate concentric with and radially spaced from the drive shaft so that the floater plate is isolated from the drive shaft. Thus a bearing is not required between these elements. As will be seen from the drawings no portion of the pressure plates extend into a plane which includes the floater plate 38.

A plurality, preferably five, of shock canister units 42–46 are mounted about the outer circumference of floater plate 38 for providing a shock absorbing connection with the flywheel. Semi-circular sockets 48–52 are formed about the rim of the floater plate at each shock canister unit location. The construction and operation of shock canister unit 42 of FIG. 4 is typical, and it is understood that the remaining canister units are similar in construction and operation. Canister unit 42 comprises a cylindrical housing or shell 54 formed of a suitable durable and rigid material such as steel tubing. The outer diameter of the shell is sized commensurate with the diameter of socket 48 so that the shell seats within the socket without play but at the same time permits relative axial sliding movement of the socket along the shell as the clutch is engaged and disengaged. The outer surface of the shell provides a bearing surface against the socket for this axial movement. Each socket opens through the rim along an arc which is less than the shell diameter so that the canister units are captured within the sockets.

Shock canister unit 42 further includes an elongate annular shock pad 56 having an axial bore 57 and which is formed of a suitable elastomeric material having good heat resistance and resilient shock absorbing properties. Preferably the material of the shock pads is a suitable silicone rubber or Neoprene having a durometer hardness in the range of 60 to 100. The shock pad can be integrally molded of the elastomeric material, or it could be built up form a plurality of stacked flat discs formed of the material. For assembling the canister unit one end of the shell is swaged radially inwardly and the shock pad is then inserted within the shell. The other end of the shell is then swaged radially inwardly to capture the pad within the shell. The canister unit could also be formed by molding and vulcanizing the elastomeric material within the shell.

Mounting means comprises five drive bolts or pins 58–62 are provided for interconnecting the canister units with the flywheel. The typical drive bolt 58 for the canister unit 42 is formed with a threaded stub end 60 adapted to be screwed within an internally threaded hole formed about the outer side face of the flywheel. An hexagonal head 62 is provided for applying a suitable wrench or other tool to mount and dismount the drive bolt on the flywheel. A flat washer 63 is mounted between the hex head and flywheel, and opposite sides or ears of this washer are turned down over the flywheel rim and hex head to lock the bolt in the hole. An integral shoulder 64 extends from the hex head, and an elongate spindle 66 extends from the shoulder with an outer diameter commensurate with the inner diameter of the shock pad bore 57. The shock pad is mounted over the spindle and pushed forward until its inner end abuts shoulder 64. A flat washer 68 is then inserted over the spindle to abut the opposite end of the pad, and a suitable fastener such as the cotter pin 70 is secured through a radial hole formed in the end of the spindle to lock the canister unit on the drive bolt.

The outer rim of the floater plate is formed with a smoothly curved contour having concave portions 72, 74 intermediate the shock canister units and convexly curved projections 76, 78 extending up to the sockets. Rotation of the floater plate causes the contoured rim to pump air radially outwardly by centrifugal action to establish an outward flow of cooling air across the surfaces of the floater and pressure plates to further aid in minimizing heat build-up in the clutch.

The use and operation of the invention is as follows. Clutch assembly 10 is adapted to be retrofit into the drive train of an existing vehicle having a dry type flywheel clutch assembly. In such case the parts which are removed from the existing clutch assembly are the drive plate with its zerk fitting, the five existing drive bolts on the flywheel, the rubberized links, bolts, and shackles previously used to interconnect the drive pins with the drive plate, and the anti-friction bearing mounted between the drive plate and drive shaft. Annular sleeve 29 is mounted between pressure plate 26 and adjusting hub 28 in place of the previous bearing with floater plate 38 being mounted about the sleeve between the two pressure plates. The assembled floater plate, pressure plates, drive shaft and clutch engaging mechanism are then connected with the flywheel by first mounting two drive bolts into adjacent holes in the flywheel. Each of the drive bolts is screwed into the holes with the flat washers 63 mounted against the flywheel. The bolts are locked to the flywheel by turning one ear of the washer around the flywheel rim and the other ear against a side of the hex head. With the flywheel turned so that these two bolts are disposed lowermost, the clutch assembly is lowered so that two lower sockets in the floater plate drop about the bolts. The shell 54 and its contained shock pad are then slipped over each bolt spindle 66 with end washer 68 and cotter pin 70 mounted on the spindle to lock the canister unit in place. The remaining bolts are then mounted on the flywheel and the canister units are secured on the spindles of these bolts within the remaining sockets of the floater plate. The opposite end of the drive shaft is then connected with the transmission of the drive train.

With the flywheel rotating, operation of the clutch lever moves release collar 20 to the right and this in turn operates the spring links 32 through their over-center position so that the cams 34 are rotated to move pressure plate 24 to the right until both faces of the floater plate are engaged by the two pressure plates. At the same time the sockets of the floater plate displace axially along the outer bearing surfaces of the canister shells. The frictional drag produced as the pressure plates engage the floater plate creates a torsional reaction shock force between the drive bolts and floater plate, and this shock force is absorbed by the yieldable compression of the shock pads during the short period of time of clutch engagement. Following engagement the shock canister units serve to transmit torque in direct drive from the flywheel to the floater plate. Also it is to be noted that during clutch engagement the inner diameter of the floater plate is isolated from the drive shaft so that any misalignment of the drive shaft does not create wobble in the floater plate. In addition any misalignment between the floater plate and drive bolts is accommodated by the elastic yielding property of the shock pads. The freedom from wobble in the floater plate eliminates dynamic play between the surfaces of the floater plate and pressure plates during clutch engagement so that friction-caused heat build up is minimized.

The clutch is disengaged by operating the clutch lever in a direction to move release collar 20 to the left as viewed in FIG. 1. This operates the spring links back through their over-center position, releasing the cams from pressure plate 24. The leaf springs 36 then urge pressure plate 24 in a direction away from the floater plate so that the frictional engagement between the plates is released. At the same time leftward movement of the release collar engages brake pressure plate 18 against brake disc 23 to stop rotation of the clutch shaft and permit shifting of the transmission without gear clashing.

From the foregoing it is apparent that there has been provided herein a new and improved clutch assembly which obviates or minimizes many of the problems inherent in existing clutches. The clutch assembly of the invention is relatively simple in design and replaces the many different parts of existing clutch assemblies with fewer and less complicated parts. The floater plate is isolated from the drive shaft so that the problem of plate wobble is eliminated, and friction is minimized so that the problem of heat build-up is eliminated. The clutch runs cooler and with a longer life both for the clutch elements and the transmission in the drive train. The elimination of the requirement for an anti-friction bearing eliminates lubrication requirements and the need for lubrication or bearing mounting holes which would otherwise weaken the drive plate and create stress risers. The clutch assembly and its component parts are easier and faster to install and replace as compared to existing clutch assemblies, and in addition the clutch assembly can be retrofit onto existing vehicles. The elimination of the plate wobble problem results in requiring less force to operate the clutch lever as compared to existing devices.

While the foregoing embodiments are at present considered to be preferred it is understood that numerous variations and modifications may be made therein by those skilled in the art and it is intended to cover in the appended claims all such variations and modifications as fall within the true spirit and scope of the invention.

What is claimed is:

1. In a drive train having a flywheel driven by an engine and a drive shaft coupled with a clutch assembly which includes at least a pair of pressure plates, the combination of an annular torque-transmitting floater plate adapted to be positioned co-axially between the pressure plates and about the drive shaft, means forming an opening in the floater plate co-axially with the drive shaft and radially spaced therefrom a distance which affords non-interfering clearance between the floater plate, pressure plates and drive shaft, with no portion of said pressure plates extending into a plane which includes the floater plate, means forming a plurality of circumferentially spaced arcuate sockets in the outer periphery of the floater plate with the longitudinal axis of each socket being generally parallel with the axis of rotation of the floater plate, a shock absorber unit mounted co-axially in each socket, each shock absorber unit including an elongate member having an axial bore and formed of an elastomeric material which is capable of resiliently absorbing shock forces transmitted from the flywheel to the clutch assembly upon interengagement therebetween, housing means enclosing each elongate member, said housing means comprising an annular shell having an outer diameter commensurate generally with the diameter of the sockets, each shell being mounted for axial sliding movement within a respective socket and with each elongate member being mounted co-axially within a respective shell, and mounting means extending axially through the bore of each elongate member for mounting the same for rotation with the flywheel.

2. A drive train having a flywheel driven by an engine and a drive shaft coupled with a clutch assembly which includes at least a pair of pressure plates, the combination of an annular torque-transmitting floater plate adapted to be positioned co-axially between the pressure plates and about the drive shaft, the inner diameter of said floater plate being radially spaced from said drive shaft to provide non-interfering clearance therewith, with no portion of said pressure plates extending into a plane which includes the floater plate, a plurality of shock canister units, each shock canister unit comprising a rigid shell together with an annular cylinder mounted in the shell, with the cylinder formed of a resilient material capable of absorbing shock energy upon engagement of the clutch assembly, means mounted for rotation with the flywheel and extending axially through the cylinders for applying torque from the flywheel to the shock canister units when the clutch assembly is engaged, means forming a plurality of arcuate sockets positioned in circumferentially spaced relationship about the rim of said floater plate with the rigid shell of each canister unit forming a bearing surface with a respective socket providing relative axial sliding movement between the floater plate and canister units, each socket opening radially outwardly through the rim along an arc which is less than the diameter of the respective shell whereby the shell is captured against radial movement within the socket.

3. The invention of claim 2 in which the annular cylinder is mounted in non-bonding contact with the inner surface of the shell, and the opposite ends of said shell are turned radially inwardly about opposite ends of the cylinder for capturing the same within the shell.

4. The invention of claim 2 which includes means forming an axially extending bore with a given diameter in each cylinder, said means mounted for rotation with the flywheel comprises a plurality of circumferentialy spaced-apart axially extending cylindrical drive members mounted about the flywheel, each drive member having an outer diameter commensurate with the diameter of the bore of a respective elongate member and with the elongate members being in non-bonded contact about the outer diameters of the drive members whereby the canister units are freely detachable from the drive members, and means for releasably locking the canister units on the respective drive members.

* * * * *